Dec. 13, 1949       W. G. GORTON ET AL       2,491,308
            APPARATUS FOR SIMULATING NAVAL
                VESSELS AND THEIR MANEUVERS
Filed April 15, 1943                          8 Sheets-Sheet 1

FIG. 1

INVENTORS
FRANK PULSIFER
WILLIAM G. GORTON
BY ARNOLD M. SKUDRE

THEIR ATTORNEY

Dec. 13, 1949  W. G. GORTON ET AL  2,491,308
APPARATUS FOR SIMULATING NAVAL
VESSELS AND THEIR MANEUVERS
Filed April 15, 1943  8 Sheets-Sheet 3

FIG. 3

INVENTORS
FRANK PULSIFER
WILLIAM G. GORTON
ARNOLD M. SKUDRE
BY
ATTORNEY

INVENTORS
FRANK PULSIFER
WILLIAM G. GORTON
BY ARNOLD M. SKUDRE

ATTORNEY

Patented Dec. 13, 1949

2,491,308

UNITED STATES PATENT OFFICE 2,491,308

APPARATUS FOR SIMULATING NAVAL VESSELS AND THEIR MANEUVERS

William G. Gorton, Belmont, Frank Pulsifer, North Reading, and Arnold M. Skudre, Allston, Mass., assignors, by mesne assignments, to Raytheon Manufacturing Company, a corporation of Delaware Application April 15, 1943, Serial No. 483,226

15 Claims. (Cl. 35—10.4)

The present invention relates to means for tracing in manoeuvre in navigation the course of each of a plurality of simulations of vessels, and in particular the course of the simulation of an unknown vessel as observed from the simulations of a vessel which might be called the observing vessel.

The present invention is more particularly related to means of tracing manoeuvres of simulations of naval vessels and to the simulation of manoeuvres of a naval surface vessel as the simulated observing source and of a simulated submarine as the target being observed. In such simulated manoeuvres it is presupposed that the naval vessel simulated is provided with sound ranging equipment by means of which the distance of the submarine and its direction from the observing vessel simulated may be determined. Further in the system herein described it is assumed that the observing vessel carries or may carry a sound projector which can produce a beam of sound waves, which projector may be rotated in the water with respect to the observing vessel for searching and finding the submarine.

In the system according to the present invention the simulation of both the searching vessel and the submarine may be independently manoeuvred under conditions simulating normal limitations of observations. The courses of both the simulation of the destroyer or other simulation of the naval vessel and that of the simulation of the submarine are thrown on a sheet, as well as the movements of the projector throwing a light beam representing sound so that students and observers may be taught and observe the tactics of the complete manoeuvre.

In brief, in the present system a translucent plate is used beneath which there is positioned an element carrying a light source which throws a spot of light on the translucent plate. This source represents the position of the surface simulated vessel. Another source of light under the plate represents the position of the simulated submarine. Each source of light is carried by a mechanism which may be moved in any direction beneath the translucent plate.

In addition to the above the mechanism representing the surface vessel carries a second source of light which throws a spot of light which travels by virtue of the rotation of a mirror across the bottom side of the plate. This spot of light may be rotated in a horizontal plane and cast a beam on the element representing the submarine, which element also has a light-sensitive cell adapted to respond when the traveling spot from the surface vessel illuminates the element simulating the submarine. The time of travel of the spot of light to the submarine corresponds to the time it takes a sound wave to travel from one actual vessel to the other and the direction in which the spot of light is thrown gives the direction of the submarine. These are the elements which determine from the actual surface vessel the range and direction of the submarine and the manoeuvres, which will be described later, employ these elements in furnishing the observer with the data that are necessary to learn how to track the submarine.

Without going into further detail regarding the advantages and merits of the present invention, the invention will be described in the specification below in connection with an embodiment of the same illustrated by the drawings in which.

In the system of the present invention a searching vessel, which may be a destroyer or any other type of surface ship, is simulated in its operation by one group of controls while a target, which is a submarine, is simulated by a second group of controls operative in a manner similar to that in which a submarine operates. The simulation of the searching vessel is controlled by means producing operations similar to operations of the vessel simulated, both with regard to speed and direction.

Figure 7:
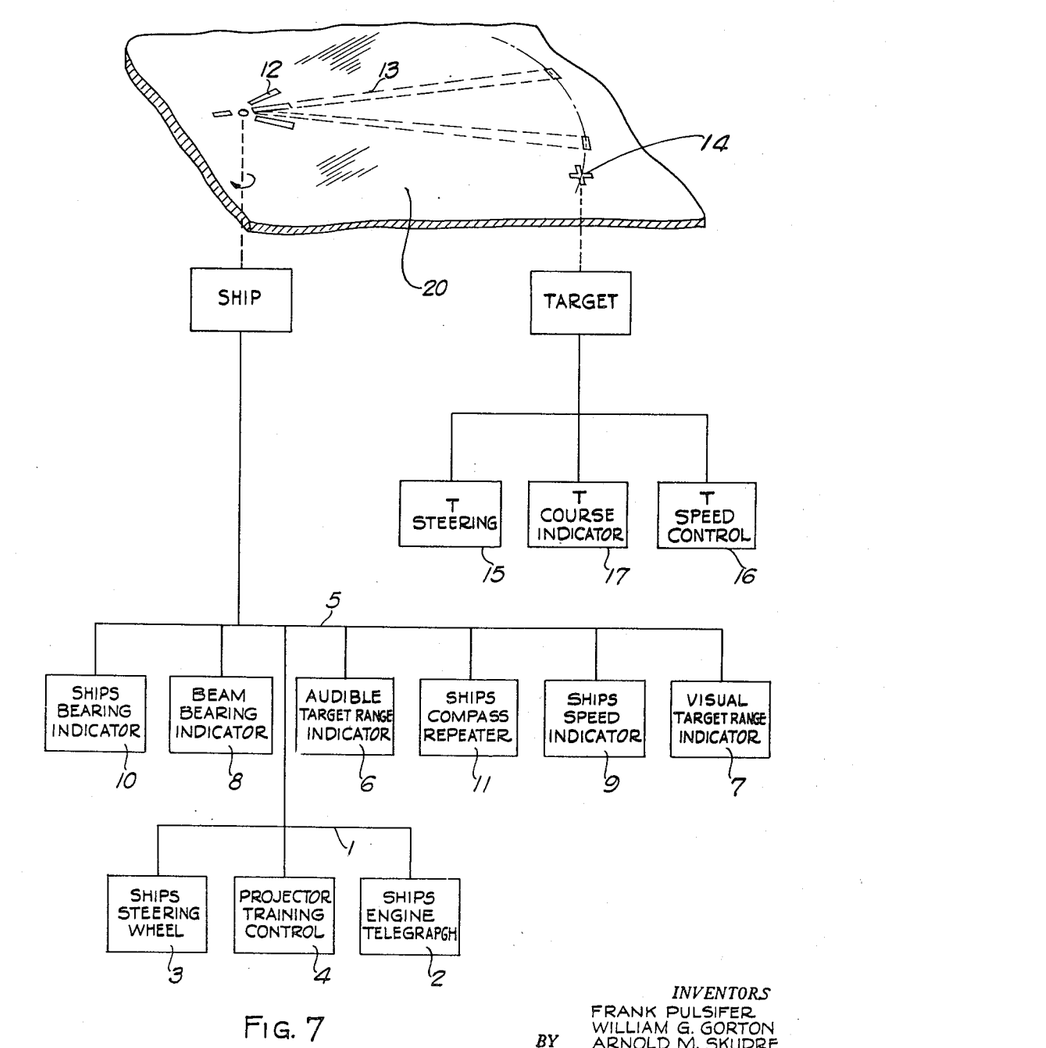
Fig. 7 shows a block diagram indicating the control for the operation of the system.

In the block diagram of Fig. 7 the elements for the control of the simulated searching vessel are shown with block diagrams having appropriate legends. The blocks stemming from the lower cross line 1 represent the elements for control of the speed block 2 of the vessel; course, block 3 of the vessel; plus the additional means provided on the vessel for locating the target being searched. This is represented in block 4 and comprises a projector with proper training control whereby a beam of wave energy may be projected against the object being searched, received after a definite time interval in such a manner that both the relative bearing of the target from the searching vessel and its simulated distance may readily be obtained.

The measuring and indicating elements for this device and the other indicating and measuring elements are shown as stemming from the upper horizontal line 5. The complete indicating system that goes with the projector training control 4 is an audible target range indicator 6, a visual target range indicator 7 and the beam bearing indicator 8, these three elements fixing the direction and the distance of the object in actual observable figures. In addition to this, however, there are provided instruments for indicating what the ship is doing, its speed by the speed indicator 9, its bearing by the bearing indicator 10 and a compass repeater 11 indicating the true compass bearing. These devices are all correlated with a visual indication of the ship thrown on a screen as a suitable projected luminous figure 12 in its true position as indicated by the instruments mentioned above and a visual indication of the beam 13 emitted by the projector in its true bearing and simulating the travel of the beam corresponding to the wave velocity, its direction, angle of spread and distance.

With regard to the submarine, it is produced as a visual image 14 on the same screen with the visual image of the destroyer and its beam and is controlled from a position from which the screen may be visible, if desired, by a steering control 15, a speed control 16 and a course indicator 17. The searching ship is provided with the searching indicators and controls so that the student may attempt to track down the target, which usually is assumed to be a submarine, with the aid of the instruments at hand representing the usual instruments provided aboard ship in actual searching and attack procedure. The operations of this ship by means of the visual indications are thrown upon the screen 20 in such a manner that observers other than the student may see the manner in which the ship simulation was operated. While the student directs the control of the searching vessel, the submarine may also be steered and controlled by some one away from the screen with or without knowledge of the operation of the control of the searching vessel. The apparatus for simulating these attack operations is shown in the other figures in the application.

Figure 1:
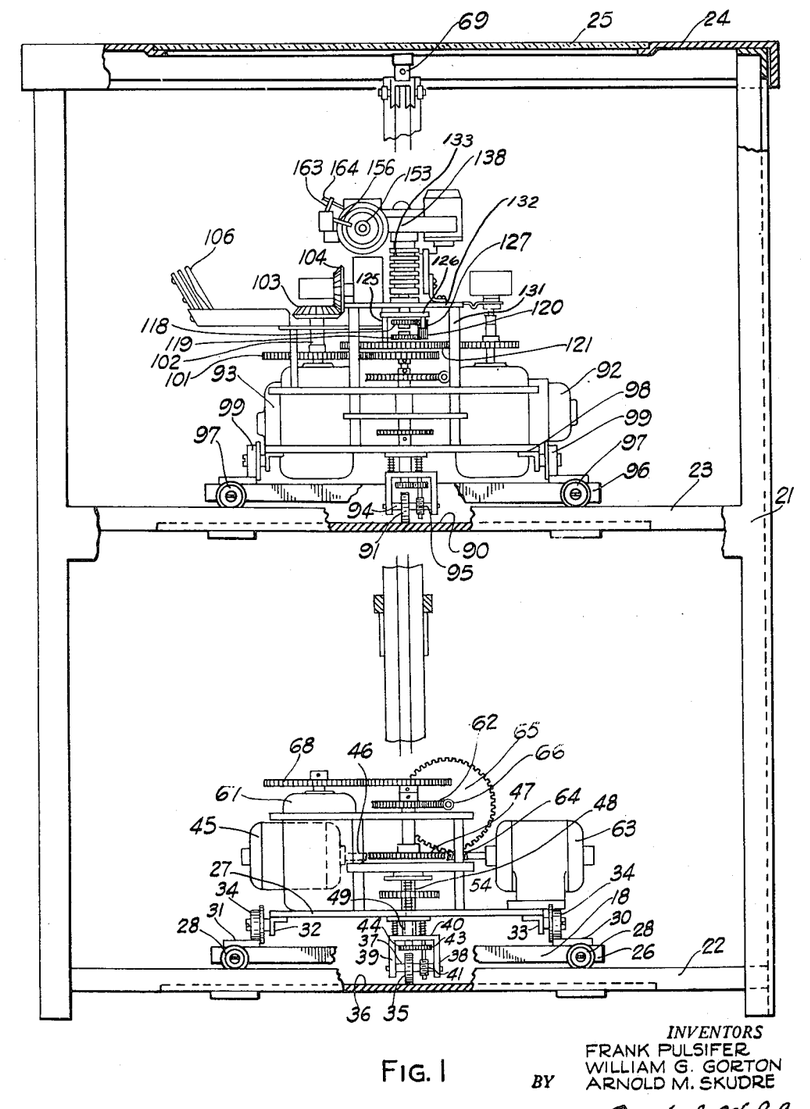
Fig. 1 shows an elevation of the apparatus with fragmentary portions broken away.
Figure 2:
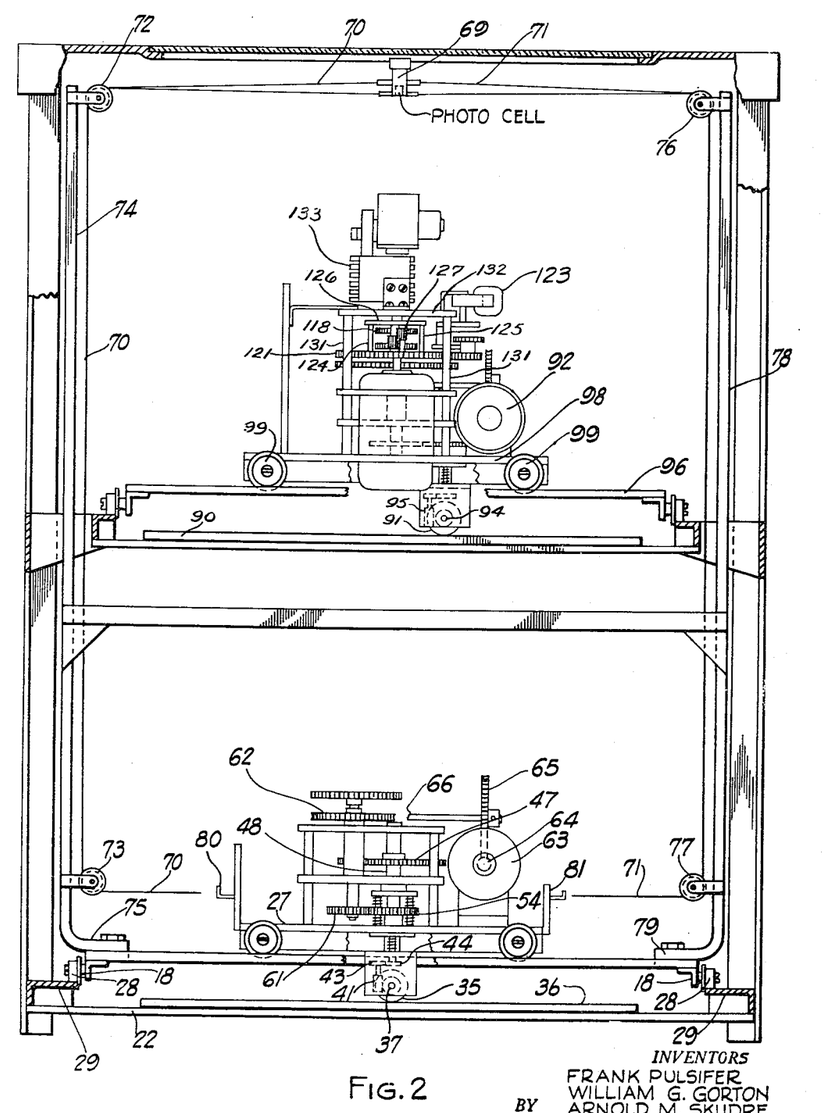
Fig. 2 shows a side elevation of the same device as shown in Fig. 1 when viewed from the right of Fig. 1.

For this purpose there is provided a frame 21 having a lower platform 22 and an upper platform 23. The frame is covered by a table top 24 which supports a screen 25 over which transparent paper may be drawn for plotting the positions of the searching vessel and the target in their course of operation. The lower platform 22 carries the device simulating the operation of the submarine. It is mounted upon two movable carriages or trucks, one truck 26 moving in the plane of the paper and the other truck 27 moving at right angles to the plane of the paper, the combination of the two producing a motion which will give freedom of movement in any direction desired. The lower truck 26 is built of two parallel supports 18 on which are mounted four wheels 28 which roll along two parallel rails or beams 29 on the lower frame 22.

On the truck 26 there are provided two cross supports 30 and 31 which bear the other or upper truck 27. This latter truck is provided with L beams 32 and 33 carrying the truck wheels 34 which move on the supports 31 of the lower carriage 26. The wheels 28 and 34 all have flanges bearing against the edge of the plates or beams on which they are supported so that the movement of the wheels will always be guided along the edge of the beam supports. It will readily be seen that since components of motion are provided in two directions at right angles to each other, a variation of velocities will produce motion in any desired direction. Motion is obtained by a single driving wheel 35 which bears against a proper friction surface 36 on the platform 22. This surface may be linoleum, cork or other yielding material, and the wheel 35 is adjusted against the surface 36 in such a manner that practically no weight or very little weight is borne by the truck wheels against their supporting rails. The wheel 35 is mounted on a shaft 37 which is journaled at both ends in supporting plates 38 and 39 which extend downward from a horizontal plate 40 forming an inverted U-shaped bracket for carrying the driving wheel. The shaft 37 is driven by the worm 41 and worm wheel 42, the latter mounted on the shaft 37. The worm wheel 41 is driven by the gear 43 (Fig. 3) which, in turn, is driven by the gear 44. The gear 44 is driven by the motor 45 which is run at such a velocity that the drive of the wheel 35 on the friction surface 36 will correspond to the vessel's speed. The motor 45 drives the gear 44 through a worm and worm gear drive 46 and 47 which drive the shaft 48 on which the gear 44 is mounted.

In order to control the course of the vessel it is necessary to rotate the supporting bracket 40 carrying the supports for the driving wheel 35 about a vertical axis in a plane corresponding to part of the course of the vessel. The plate or bracket 40 is supported for free motion by the sleeve 49 surrounding the shaft 48.

Figure 5:
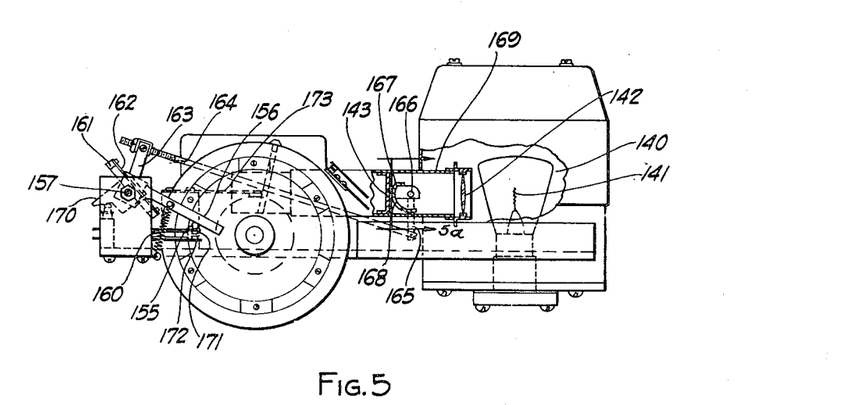
Fig. 5 shows an elevation of a detail used in simulating the ranging device.
Figures 5A, 8, 9:
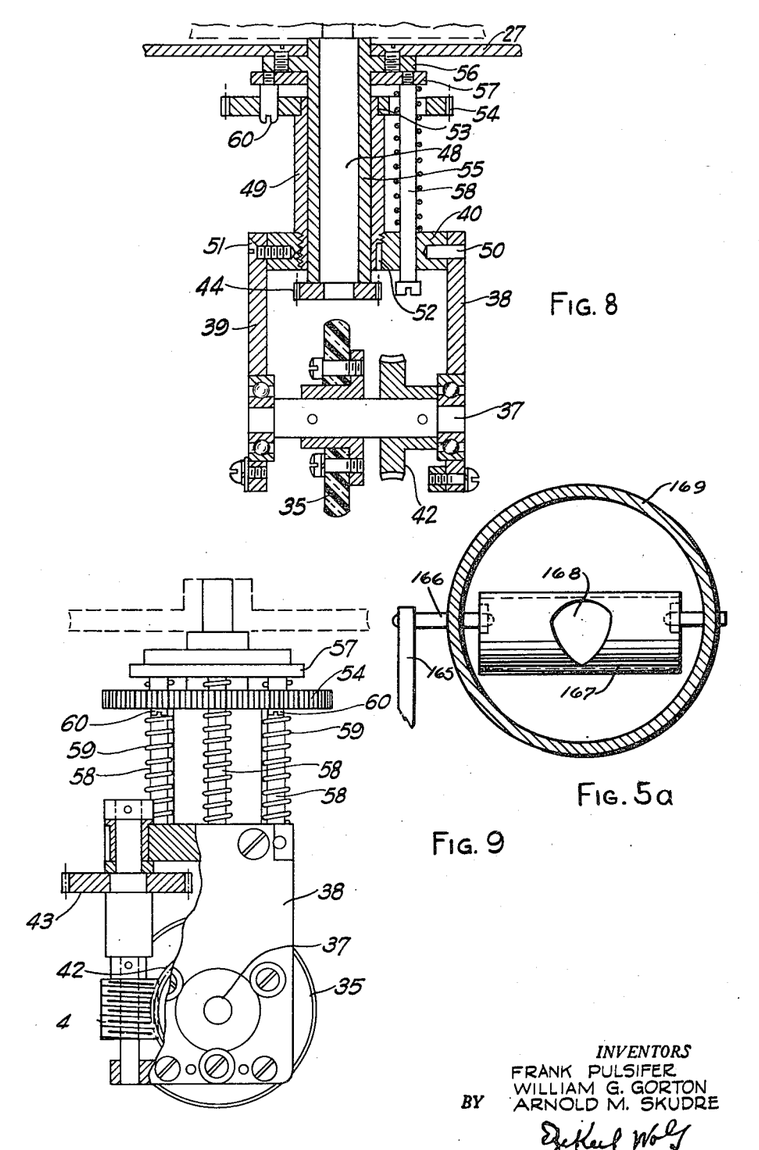
Fig. 5a shows a vertical section of a part of the apparatus on the line 5a, 5a in Fig. 5.
Fig. 8 is a vertical section of a detail.
Fig. 9 is a side elevation of the detail of Fig. 8.

The actual construction of this detail is shown more specifically in Figs. 8 and 9. In this construction the side plates 38 and 39 are held to the top horizontal plate 40 by means of dowels and screws 50 and 51, respectively. The top plate 40 is threaded to receive the end of the sleeve 49 to which it is pinned in place by the pin 52. At the top end of the sleeve 49 there is provided a shoulder 53 upon which the spur gear 54 is fixed. The sleeve 49 rotates about a second sleeve 55 which surrounds the shaft 48. This sleeve 55 has at its top end an outwardly extending flange 56 by which it is held to the frame of the truck 27. Bearing against the flange 56 but not fixed to it is a flat ring 57 which carries three long studs 58 which extend through the holes in the plate 40. These studs are each surrounded by springs 59 which exert a pressure between the plate 40 and the plate 57 tending to force these two elements apart. The plate 57 is further locked with the gear 54 by means of the screws 60 which extend through holes in the disc of the gear 54. The result of this construction is that the springs 59 force the structure carrying the driving wheel 35 down against the floor 36, and at the same time the shaft 48 drives freely the wheel arrangement previously described. In addition to this, the plate 57 is freely turned by means of the pins 60 engaging the disc of the gear 54 so that the rods 58 maintain their same position with respect to the gear 54. The shaft 37 on which the wheel 35 is journaled will be rotated about a horizontal plane by motion of the plate 40.

Figure 3:
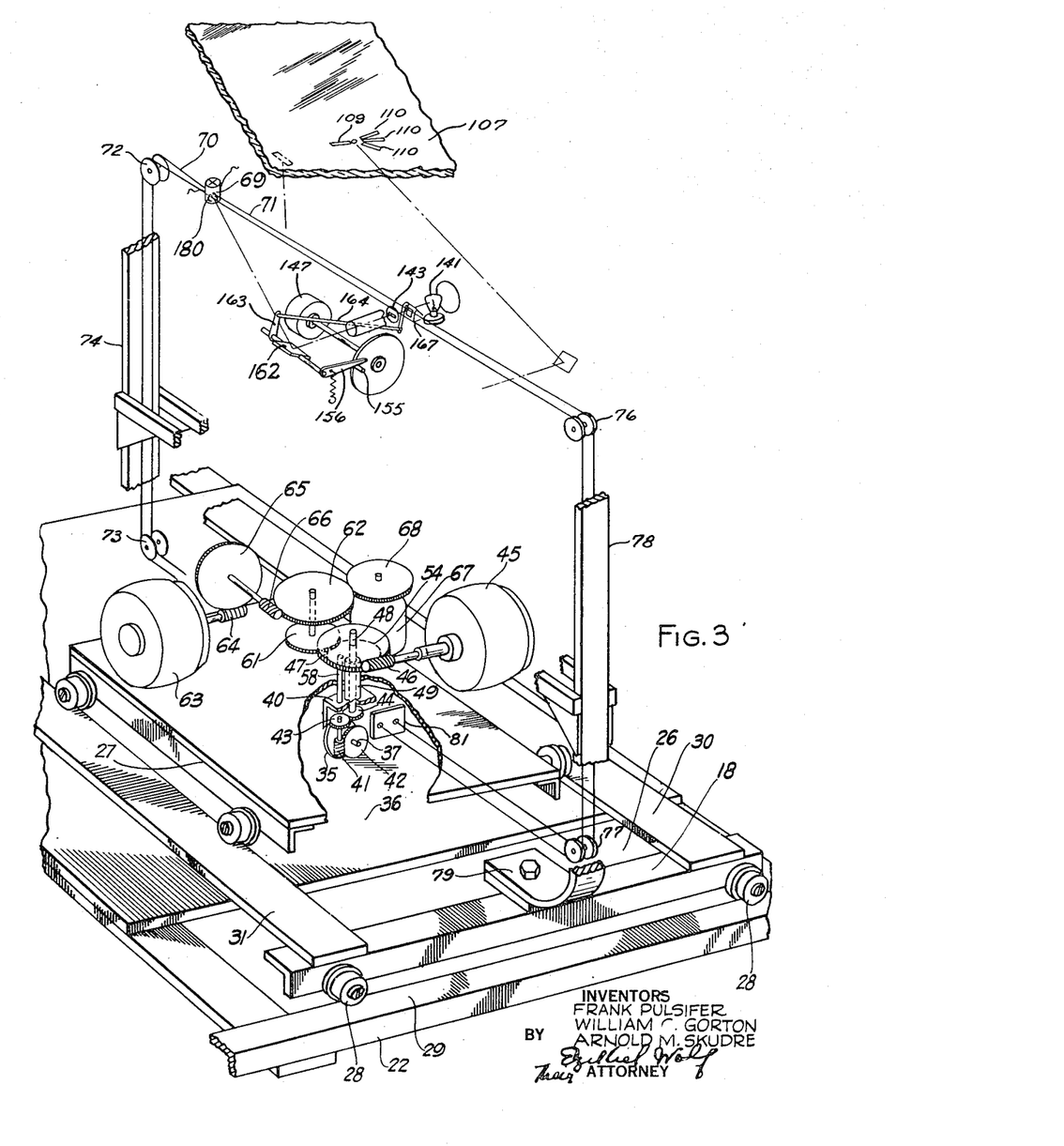
Fig. 3 shows a fragmentary perspective view of the device simulating the submarine course.

In the perspective diagrammatic representation of Fig. 3 the sleeve 49 is shown as driven by the spur gear 54 in which the rod 58 is fastened extending down to the plate 40. The spur gear 54 is driven by the gear 61 which, in turn, is driven by the gear 62 which obtains its energization through the motor 63 driving the worm gear reduction system comprising the worm 64, the worm gear 65, the worm 66 and the gear 62. The motor 63 is driven in accordance with the simulated ship's course and, if desired, a repeater for the system may be obtained by the use of a repeater motor 67 connected to the gear 62 through the gear 68. The wheel 35 bearing against the friction table or fixed platform 36 will be driven in speed and direction corresponding to the course of the target vessel. This motion of the wheel 35 will carry the two platforms 26 and 27 over the rails on which they move corresponding continually to the position of the target vessel.

The representation of the submarine is a small light source 69 which is supported by two wires 70 and 71 attached at either side. This light source as indicated in Fig. 2 is positioned just under the screen 25 and directed up towards it so that it will be visible from the top of the screen. The wire 70 carries over a pulley 72 and downward at the side of the frame to a pulley 73. Both pulleys 72 and 73 are carried by a rod 74 which is supported in a bracket 75 to the frame element 18 of the lower truck 26. The wire 71 is similarly carried over the pulley 76 down to the lower pulley 77 both of which are carried by the rod 78 which is fastened by means of a bracket 79 to the base-supporting beam 18 of the truck 26. The light source 69 will, therefore, be carried in the same direction as the truck 26 by the lateral movement of the wires 70 and 71. The wires 70 and 71, however, after passing under the pulleys 73 and 77, respectively, are attached to supporting brackets 80 and 81 to the second carriage 27 which moves, as has been explained above, in a direction at right angles to the motion of the carriage 26. In this manner the longitudinal motion of the wires 70 and 71 is obtained and therefore the target image may be moved, referring to Figs. 1 and 2, in any direction. In this connection the motor 45 provides the speed drive and the motor 63 provides the steering drive.

The upper platform 23 (Fig. 2) supports the device for simulating the manoeuvre of the searching vessel. This platform is provided with a floor 90 having a frictional surface upon which the driving wheel 91 bears corresponding to the wheel 35 of the lower device. With respect to the manoeuvres of the means representing the searching vessels the parts in the device carried on the platform 23 are similar to those on the lower platform 22. They comprise a steering-driving motor 93, a ship's speed motor 92 with a similar arrangement for rotating the shaft 94 upon which the drive wheel 91 is mounted and also a similar arrangement for driving the wheel 91 through the worm gear 95. This device also comprises two carriages, one 96 for moving the device in the plane of the paper as viewed in Fig. 1 by means of the truck wheels 97 and a second carriage 98 supported by truck wheels 99 for moving the device perpendicular to the plane of the paper as viewed in Fig. 1. In Fig. 2, of course, which is a side view of Fig. 1, these relationships are changed.

Figure 4:
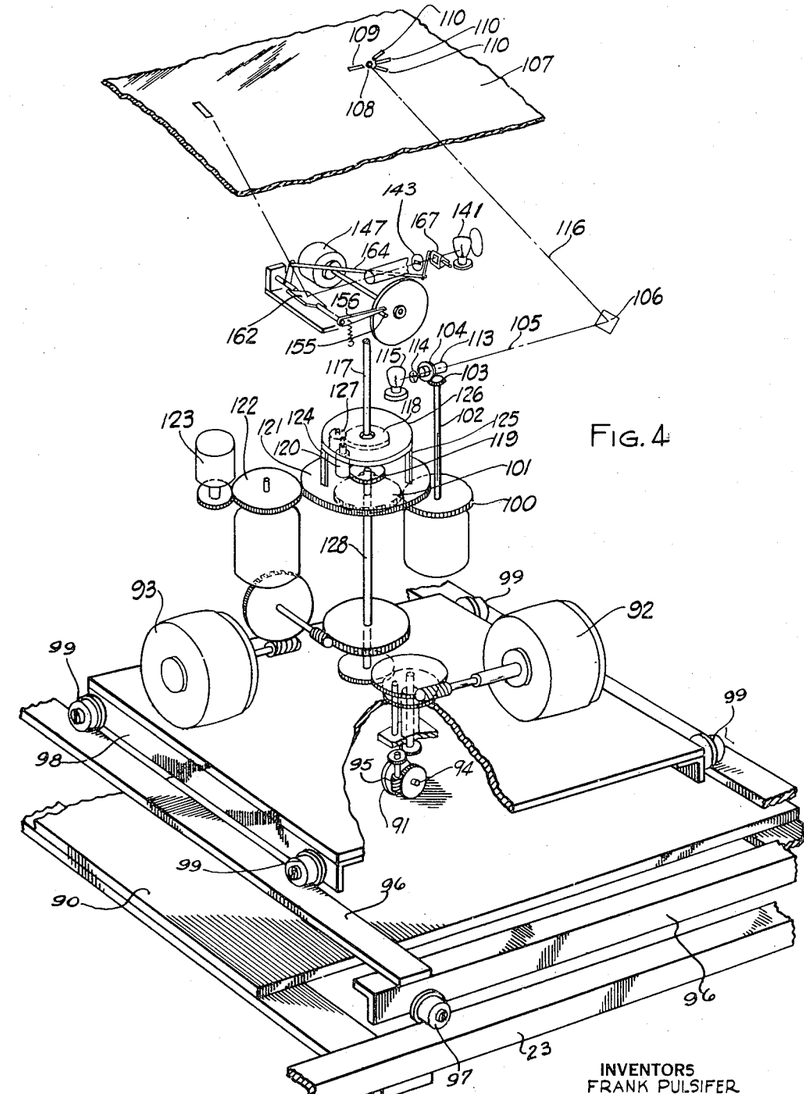
Fig. 4 shows a fragmentary perspective view of the device simulating the vessel manoeuvring for the destruction of the submarine.

A schematic arrangement for the means representing the searching vessel's drive and the means by which its image is thrown upon the screen and also the means by which the searching of the means representing the enemy vessel, submarine or target is accomplished, is shown schematically in Fig. 4. The motor 93, which is the steering driving motor for the ship, drives the gear 100 which, in turn, meshes with the gear 101 in a one to one ratio for driving the shaft 102 at the same rotational velocity with which the driving wheel 91 for the whole carriage is rotated about its supporting shaft 94.

The driving shaft 102 (Fig. 4) is provided with a bevel gear 103 driving another bevel 104 which carries a tube 113 provided with a figure 114 mounted in it and adapted to be rotated about a horizontal axis. A light source 115 fixed in position on the carriage throws a beam 105 through the tube 113 against a mirror 106 positioned at an inclination of about 45 degrees by means of which the vertical figure 114 is converted to a horizontal figure 108 on the screen 107. This figure 108 has a symmetry about a horizontal line with a light portion 109 which may be assumed to indicate the bow and portions 110 which may be assumed to indicate the stern of the vessel. The rotation of the tube 113 about a horizontal axis corresponds to the same rotation of the driving wheel 91 about its horizontal axis; thus, as the means representing the vessel is turned, so also the image 108 is rotated in the horizontal plane. The beam 116 from the mirror 106 throws its image 108 on the screen so that the center of the image is directly over the position from which the image of the sound radiates in the searching for the submarine or target. The mechanism for rotating the apparatus simulating the projector is controlled and operated by means of the shaft 117 which carries the mechanism for simulating the projector and the projection of the beam. The shaft 117 is driven by a gear 118 pinned to the shaft.

Figure 10:
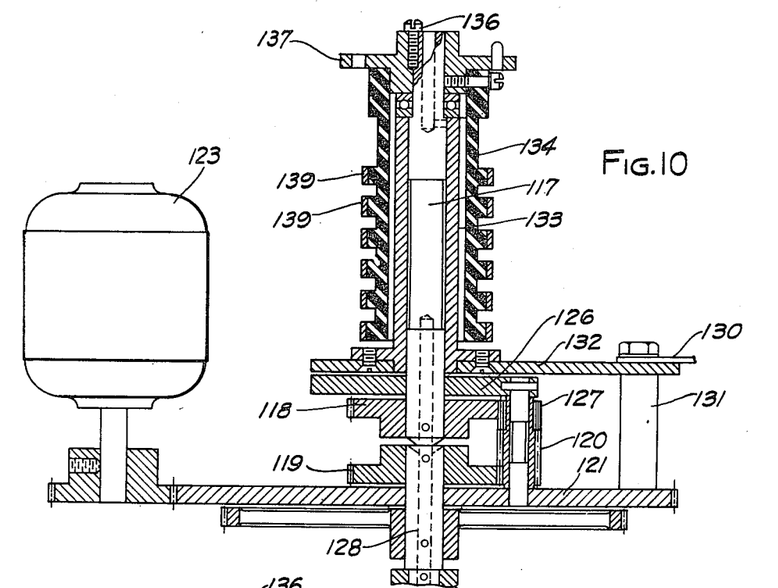
Fig. 10 shows a further detail of a portion of the apparatus.
Figure 11:
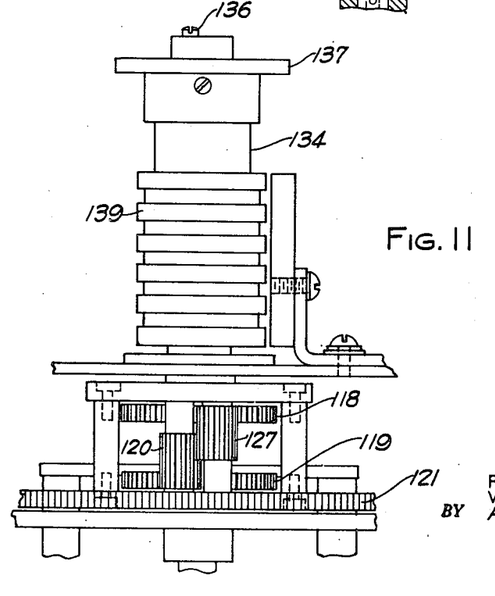
Fig. 11 shows a side view of a portion of the detail shown in Fig. 10.

Since the projector in actual practice is carried by the ship and rotated with respect to it, in the simulation there are two components to make up the composite control of the projector, one by the rotation of the ship simulation itself and the other by the rotation of the projector. This is controlled through a differential system. Mounted on the same shaft 128 which carries the gear 101 and which rotates in accordance with the turning of the means representing the vessel is the gear 119 which is positioned with its axis opposite that of the shaft 117. A small gear 120 meshes with the gear 119 and this is supported in the disc gear 121 which meshes with the gear 122 which, in turn, is rotated by the motor 123. The motor 123 is synchronized with the rotation of the projector. The disc gear 121 carries a pair of spacer bars 124 and 125 at the ends of which a plate 126 is mounted serving as the other bearing member for the gear 120. A similar gear 127 also is journaled at its ends in the disc gear 121 and the plate 126. This gear 127 meshes with the gear 120 and also with the gear 118. The result of this arrangement is that if the gear 121 turns while the gear 119 remains stationary (that is, the means simulating the searching vessel is not turning on its course), the shaft 117 will rotate at the same speed as the projector rotates. This rotation will then be controlled by the motor 123. If, however, the means simulating the ship is turned on its course, a component of motion will be furnished by the gear 119 either increasing or decreasing the rotation of the projector with reference to the ground depending upon whether the means simulating the ship is turning in the direction of the rotation of the projector or in a direction opposite to it. This mechanism is shown in greater detail in Figs. 10 and 11.

Figure 6:
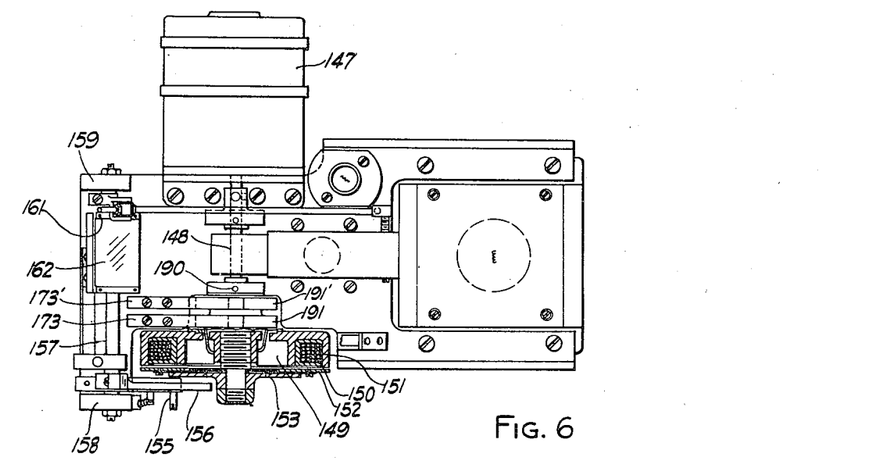
Fig. 6 shows a plan view of the device shown in Fig. 5.

This arrangement is shown more clearly in Figs. 1, 2, 10 and 11. A supporting bar 131 supports the plate 132 which has a sleeve 133 mounted thereon enclosing the shaft 117. The shaft 117 passes through the plate 132 and also the disc 126 within which it is free to turn. The shaft 117 is pinned to the gear 118 which meshes with the gear 127 journaled between the plates 126 and the disc gear 121. The shafts 117 and 128 are aligned with each other but not joined so that the gears 120 and 127 independently turn by the rotation of the shafts 128 and 117, respectively. A sleeve 134 is pinned to a flange 137 which, in turn, is anchored to the shaft 117 through the screw 136. The mechanism shown in Figs. 5 and 6 is mounted on the flange 137. This mechanism 138 simulates the emission of the sound beam by a travel of a spot of light by rotation of the mirror 162 from the point 108 where the means simulating the vessel is situated in any desired direction depending upon the orientation of the mirror 162. The sleeve 134 carries a group of conductive rings 139 by which power is supplied to this mechanism.

The mechanism shown in Figs. 5 and 6 comprises a box 140 with a light source 141 which is focused by means of a lens 142 through a slit 143 running horizontally, perpendicularly to the plane of the paper in Fig. 5. A motor 147 drives a shaft 148 upon which is mounted a magnetic clutch 149. The clutch comprises a toroidal coil 150 placed in a shell 151 one side of which is open and covered by a flat ring 152 of magnetizable material. This ring is supported by a plate 153 which is mounted freely upon the shaft 148. The toroidal shell 151 is screwed on to the shaft 148 so that the shell and coil rotate with the shaft. When current is applied to the coil 152 which is accomplished through the spring contacts 173 and 173' bearing against the slip rings 191 and 191', the magnetizable ring 152 is drawn against the clutch magnet 149, thus making the plate 153 turn with the shaft 148. The plate 153 carries a pin 155 engaging an arm 156 which is attached to a shaft 157 journaled in two brackets 158 and 159. The arm 156 is tensioned by means of a spring 160. The shaft 157 carries a plate 161 on which a mirror 162 is mounted. Also attached to the shaft 157 is a bar or rod 163 which carries a comparatively long adjustable rod 164 which is pivoted or linked with a crank 165 from the shaft 166. This shaft 166 is journaled in the tube in which the light rays are concentrated towards the slit 143. The shaft 166 carries a sector 167 of a cylindrical shell in which there is a tapered perforation 168 (see Fig. 4) which is rotated before the slot 143 by the movement of the rod 164. The movement of the tapered slot 168 is synchronized with the motion of the mirror 162 such that the beam of light thrown by the mirror on the screen gradually widens as it leaves the means simulating the vessel 108. The shape of the tapered slot 168 is shown in Figure 5a in a partial sectional view along a line between the slit 143 and the cylindrical shell 167, looking toward the shell 167 inside the tube 169.

The motor 147 is turned all the time during the operation. When the light spot begins to travel simulating the sound beam being emitted and travelling to the submarine, the disc 153 begins to turn with the motor so that the pin 155 lifts the arm 156 against the action of the spring 160, thus rotating the shaft 157. This action swings the light beam from the spot at which the searching vessel is positioned, namely the spot 108, outward across the screen in the direction in which the projector is pointed which is the direction in which the tube 169 through which the beam of light passes is directed. As the beam swings outward away from the searching vessel, the shield or mask 167 is also raised, widening the beam of light as it swings away from said searching means simulating the vessel. The velocity of the beam is such that at any instant the distance of its position on the screen from the vessel corresponds to the measured distance obtained by the time-of-travel method of a sound beam from the searching vessel to the point where the traveling spot of light may be. When the beam has swung out to its maximum range, a finger 170 on the shaft 157 breaks a contact which trips a switch disengaging the clutch and returning the cam or plate 153 back to its normal position. As this occurs, the pin 155 makes the contact between the contact points 171 and 172 which momentarily energizes the clutch to prevent the spring tensioned arm 156 from causing a rebounding of the plate 153 so that the operation of the projector may begin again.

In the operation of the system the light source also carries a photo-cell 180 so that when the light beam from the mirror 162 passes across the active surface of this photo-cell 180, which is at the bottom of the light source unit 69 representing the submarine or target, a circuit is completed operating the visual and audible target range indicators 6 and 7. These, of course, may be located in any position and usually are located in the vicinity where the other control devices of the ship are so that the operator can easily observe their indications. The interval of travel between the time when the beam leaves the means representing the searching vessel in its swing to the time when it comes in contact with the photo-cell 180 measures the distance of the means representing the submarine and the direction in which the beam travels measures the direction of the means representing the submarine or target from the means simulating the searching vessel.

The device as described above is primarily intended for the purpose of teaching the military personnel the various manoeuvres in detecting and hunting down an enemy submarine from a searching vessel. The screen upon which the travel of both the means simulating the searching vessel and the means representing the submarine are shown may be viewed by those not taking part in the actual manoeuvre training, using only the equipment available on their respective ship's simulations. Initially the operator on the supposed searching vessel must locate the supposed submarine and then must determine by successive ranging operations not only the course and speed of the means simulating the submarine, but he must also plan a course of attack against the supposed submarine depending upon the type of device he is using for attack. The person observing the screen will see the manoeuvres of both vessels and will be able to tell the operator of the supposed searching vessel what, if any, mistakes were made in the attacking manoeuvres.

The device according to the present invention can be used for many tactical problems and can exhibit various different types of solutions both from the point of view of the submarine operation and the point of view of the searching vessel. The control of the means simulating the submarine unit is obtained in such a manner as to produce a speed for it corresponding to the usual speeds of the submarine and manoeuvre in its simulated manner both with regard to the underwater speed of the submarine and its manoeuvre in course. By controlling the speed and course with a single frictional drive on a friction platform it is possible to adjust the operation of both the means simulating the searching vessel and the means representing the submarine so that the operating facilities of each will remain within conditions of operation not incomparable with those normally existing. As an added feature in order to simulate complete searching operation, noise elements may be introduced into both the audible target range indicator and the visual target range indicator and also sensitivity of the audible and visual signals may be controlled through the widening of the beam as it recedes from the means simulating the searching vessel. The widening of the beam is adjusted for the same angle opening as a projected supersonic sound beam that is commonly used and in this manner similar conditions for sound ranging may be obtained.

Having now described our invention, what we claim is:

1. A system for simulating war manoeuvres of a surface naval vessel and hostile submarine, comprising independent mechanisms having elements for moving the same in any desired course and at any speed, means independently controlled for operating said elements for simulating the course of the vessel and the submarine and means included in said mechanisms for visually indicating the simulated course of the vessel and the submarine, and means for producing a travelling light beam carried by the mechanism simulating the surface vessel cooperating with a light-detection means carried by the mechanism simulating the submarine for simulating the detection of distance and direction of the submarine.

2. In a system for simulating manoeuvres of a vessel, a platform, a carriage having freedom of motion in a given direction, a second carriage carried by the first having freedom of motion in a direction at right angles to the first carriage and a driving wheel supported from said second carriage and frictionally engaging with said platform and means for freely and simultaneously driving and turning said driving wheel whereby said carriages are provided with motion in directions at right angles to each other dependent upon the direction of drive of said wheel.

3. In a system for simulating manoeuvres of a vessel, a platform, a carriage having freedom of motion in a given direction, a second carriage carried by the first having freedom of motion in a direction at right angles to the first carriage and a driving wheel representing the vessel supported from said second carriage and frictionally engaging with said platform and means for freely and simultaneously driving and turning said driving wheel whereby said carriages are provided with motions in directions at right angles to each other dependent upon the direction of drive of said wheel, a viewing screen and means for visually indicating the position of the driving wheel on the viewing screen whereby the position of the vessel simulation is established.

4. In a system for simulating manoeuvres of a surface vessel, a platform, a carriage mounted for free motion in a given direction across the platform, a second carriage supported by the first carriage and mounted for free motion in a direction at right angles to the free motion of the first carriage, a driving wheel having frictional contact with the platform and having a spring support substantially relieving the pressure of the second carriage on the first, means carried by the second carriage for driving the frictional wheel at a speed proportional to the speed of the vessel simulation being manoeuvred and means for turning said wheel during the drive to keep and establish the desired course of the vessel simulation being manoeuvred.

5. In a system for simulating manoeuvres of a surface vessel, a platform, a carriage mounted for free motion in a given direction across the platform, a second carriage supported by the first carriage and mounted for free motion in a direction at right angles to the free motion of the first carriage, a driving wheel having frictional contact with the platform and having a spring support substantially relieving the pressure of the second carriage on the first, means carried by the second carriage for driving the frictional wheel at a speed proportional to the speed of the vessel simulation being manoeuvred and means for turning said wheel during the drive to keep and establish the desired course of the vessel simulation being manoeuvred and visual means carried by said second platform for indicating on the screen the vessel simulation being manoeuvred.

6. In a system for simulating manoeuvres of a surface vessel, a platform, a carriage mounted for free motion in a given direction across the platform, a second carriage supported by the first carriage and mounted for free motion in a direction at right angles to the free motion of the first carriage, a driving wheel having frictional contact with the platform and having a spring support substantially relieving the pressure of the second carriage on the first, means carried by the second carriage for driving the frictional wheel at a speed proportional to the speed of the vessel simulation being manoeuvred and means for turning said wheel to preserve the course of the vessel simulation being manoeuvred and means operative in cooperation with the simulation of the vessel for simulating the operation of a projector upon the vessel, said simulation comprising means producing a beam of light, means for rotating the beam of light in synchronism with the rotation of a projector and differential means actuated in conjunction with the means producing the change of course in the vessel simulation for producing the simulation of the true beam direction.

7. In a system for simulating the manoeuvres of a surface vessel in search of a submersible craft, a mechanism adapted to be manoeuvred over a surface corresponding to a surface vessel adapted to be manoeuvred over the water, means carried by the mechanism simulating the said vessel being manoeuvered for simulating by a light beam the sound ranging for the detection of a submersible vessel, said means comprising means for producing a light beam, means for supporting said last means for rotation about an axis at right angles to a surface simulating the water, a screen upon which the visual image of said beam is adapted to be thrown and means for causing the beam of light to travel over said screen from a point representing the position of said vessel in the direction of the propagation of the sound beam.

8. In a system for simulating the manoeuvres of a surface vessel in search of a submersible craft, a mechanism adapted to be manoeuvred over a surface corresponding to a surface vessel adapted to be manoeuvred over the water, means carried by the mechanism simulating said vessel being manoeuvred for simulating by a light beam the sound ranging for the detection of a submersible vessel, said means comprising means for producing a beam of light, a reflecting mirror, a screen, means for rotating said reflecting mirror whereby said beam travels across this screen from a point corresponding to the position of said vessel on said screen at a speed corresponding to distance measurement by sound velocity methods, means supporting the elements for producing the apparatus simulating the sound beam and its travel and means for rotating said supporting means corresponding to the rotation of the sound projector on a vessel.

9. In a device of the type described, a mechanism for simulating by means of a beam of light the travel of a sound wave comprising a housing having a light source and means for condensing a beam of light, a mask pivoted for rotation and positioned before the light source for permitting the passage of a beam of a chosen width, a mirror, means mounting said mirror for rotation about an axis such that the reflection of the beam of light will travel across a screen when the mirror is turned and means electrically operated for causing the rotation of said mirror and the oscillation of said mask within definite angular limits of travel whereby in conjunction with the rotation of the mirror and mask the width of the light beam away from its point of emission will gradually widen simulating a sound wave.

10. In a device of the type described, a mechanism for simulating by means of a beam of light the travel of a sound wave comprising a housing having a light source and means for condensing a beam of light, a mask positioned for rotation and positioned before the light source for permitting the passage of a beam of a chosen width, a mirror, means mounting said mirror for rotation about an axis such that the reflection of the beam of light will travel across a screen when the mirror is turned and means electrically operated for causing the rotation of said mirror and the oscillation of said mask within definite angular limits of travel, said means for rotating said mirror and said mask comprising a motor driving a shaft, a magnetic clutch mounted on said shaft, an armature disc freely mounted on the shaft, said armature disc carrying a pin and an arm attached to a mirror shaft engaging said pin whereby when said magnetic clutch is energized, said pin will cause a rotation of the mirror shaft and a link mechanism joining said mirror shaft and the pivot of said mask for turning the latter.

11. In a system for simulating the manoeuvre of a vessel, means operating to produce the motion simulating the motion of the vessel over a stationary platform, said means including a frictional driving wheel having a yoke in which said driving wheel is journaled, means suspending said supporting yoke from said first-named means including a spring member and means permitting limited expansion of the spring member to force the yoke such that a frictional contact will be made between the driving wheel and the platform.

12. In a system for simulating the manoeuvre of a vessel, a platform, a carriage having a freedom of motion in a given direction, a second carriage carried by the first having a freedom of motion in a direction at right angles to the first carriage and a driving wheel supported from the said second carriage and frictionally engaging said platform for driving said carriage in simulation of the motion of a vessel, said first carriage carrying upwardly extending supporting brackets and cable means supported thereby, a visual indicating means simulating a vessel supported by said cable means, said cable means being attached at opposite ends to the second carriage whereby the first carriage moves said cable means laterally and the second carriage moves said cable means longitudinally for maintaining visual indicating means corresponding to the position of the second carriage.

13. In a system for simulating manoeuvres of a vessel, a platform, a plurality of carriages mounted one on the other, each adapted to move only in directions at right angles to each other and a driving wheel carried by the topmost of the carriages, said driving wheel being moved in accordance with the simulated position of the vessel, a screen, a visual indicating means carried by said topmost carriage for throwing the simulated position of the vessel on the screen, the movement of said carriages being in accordance with the vector component at right angles to each other of the actual motion of the vessel simulated.

14. In a system for simulating manoeuvres of a vessel, a screen, an indicating element comprising means having a light source throwing a light from one face on said screen and a photocell having its active face mounted in a position at right angles to the face from which the light is thrown on the screen and adapted to be effected by a beam of light approaching in a direction substantially parallel to the screen and means manoeuverable beneath the screen simulating a vessel being manoeuvred, said means having a light beam adapted to be rotated in a plane in which the active face of the photo cell is situated.

15. In a system for simulating manoeuvres of a surface vessel and a submarine, a screen, visual means including a light source for simulating fore and aft direction of a vessel, visual means including a light source for simulating the submarine, means independently controlled for moving each of said light sources for simulating the motion of the respective vessels over the screen and means for sweeping a light beam from the position of one of the vessels outward in any desired direction and photoelectric cell means carried by the means simulating the other vessel for producing an indication when the sweeping beam moves over the path of the light source of the other vessel.

WILLIAM G. GORTON.
FRANK PULSIFER.
ARNOLD M. SKUDRE.

REFERENCES CITED

The following references are of record in the file of this patent:

UNITED STATES PATENTS

| Number | Name | Date |
| --- | --- | --- |
| 830,718 | Holt | Sept. 11, 1906 |
| 1,985,265 | Smith | Dec. 25, 1934 |
| 2,160,131 | Doerbler | May 20, 1939 |
| 2,164,412 | Koster | July 4, 1939 |
| 2,179,663 | Link | Nov. 14, 1939 |
| 2,224,182 | Crooke | Dec. 10, 1940 |
| 2,329,612 | Hill | Sept. 14, 1943 |